(12) United States Patent
Seong

(10) Patent No.: US 6,306,523 B1
(45) Date of Patent: Oct. 23, 2001

(54) METHOD OF MANUFACTURING POROUS ELECTRODE WIRE FOR ELECTRIC DISCHARGE MACHINING AND STRUCTURE OF THE ELECTRODE WIRE

(76) Inventor: Ki Chul Seong, 1424-1606, Mokdong Apt, Shinjing-dong, Yangchun-ku, Seoul, 158-070 (KR)

( * ) Notice: Subject to any disclaimer, the term of this patent is extended or adjusted under 35 U.S.C. 154(b) by 0 days.

(21) Appl. No.: 09/147,888
(22) PCT Filed: Jul. 30, 1998
(86) PCT No.: PCT/KR98/00233
§ 371 Date: May 28, 1999
§ 102(e) Date: May 28, 1999
(87) PCT Pub. No.: WO99/06183
PCT Pub. Date: Feb. 11, 1999

(30) Foreign Application Priority Data

Jul. 30, 1997 (KR) .................................................. 97/36214

(51) Int. Cl.[7] .................................. B32B 5/18; B05D 5/12
(52) U.S. Cl. ............................ 428/613; 148/536; 156/47; 219/69.12; 427/117; 427/156; 427/257; 427/276; 427/277; 427/287; 427/357; 427/431; 427/433; 427/436; 428/601; 428/644; 428/647; 428/652; 428/658; 428/674; 428/687; 428/926; 428/939
(58) Field of Search ..................................... 428/674, 687, 428/613, 644, 647, 652, 658, 926, 939, 601; 427/431, 433, 436, 117, 156, 178, 257, 276, 277, 287, 357, 319; 118/125; 156/47; 148/536; 219/69.12; 204/206

(56) References Cited

U.S. PATENT DOCUMENTS 5,945,010 * 8/1999 Tomalin ............................. 219/69.12

FOREIGN PATENT DOCUMENTS

| 57170926 | 10/1982 | (JP) . |
| 60104616 | 6/1985 | (JP) . |

* cited by examiner

*Primary Examiner*—Robert R. Koehler

(57) ABSTRACT

The present invention relates to a porous electrode wire for use in electrical discharge machining and the method of manufacturing the same. The wire improves the machining speed at least 15% compared with a conventional zinc coated wire, which results from an increased cooling ability of the wire with a cooling liquid because of the increase in the surface area of the wire having porous surface morphology. Since the surface of the porous wire presents uniform profile of outer periphery rather than surface protrusions, it does not affect machining accuracy. Further, the porous nature of the wire is expected to improve flushability during the electrical discharge machining, providing spaces to eliminate particles of the machining. Therefore, in accordance with the method of the present invention, a zinc coated wire having improved performance of machining speed and flushability compared with a conventional coated wire can be provided without additional processes.

18 Claims, 4 Drawing Sheets

METHOD OF MANUFACTURING POROUS ELECTRODE WIRE FOR ELECTRIC DISCHARGE MACHINING AND STRUCTURE OF THE ELECTRODE WIRE

This application is the national phase under 35 U.S.C. §371 of PCT International Application No. PCT/kr98/00233 which has an International filing date of Jul. 30, 1998 which designated the United States of America.

BACKGROUND OF THE INVENTION

1. Field of the Invention

The present invention relates to an electrode wire for use in electrical discharge machining and the method of manufacturing the same, particularly to a porous electrode wire having an improved machining speed and the method of manufacturing the same.

2. Description of the Background Art

FIG. 1 represents a schematic drawing of a wire electrical discharge machine. An electrode wire is inserted through a start hole(7) of a workpiece(1), which is continuously fed through the hole. A high frequency voltage is applied between the wire(2) and the inside of the hole(7) to initiate an arc discharge between them. Then, machining the workpiece(1) to a desired shape can be achieved by melting the workpiece during the arc discharge and by removing the machining particles using a machining liquid and an instantaneous vaporization power between the wire and the workpiece. In accordance with the machining principle, the wire electrical discharge machine includes a power supply(6), a wire transfer means, a workpiece moving means and a circulating means of the machining liquid.

In general, the workpiece moving means, as indicated by the arrow in FIG. 1, moves during the machining of a workpiece on a plane perpendicular to the wire feeding direction. The wire(2) from a supply spool(3) travels to a take-up roll(4) through a wire transfer means including the upper and the lower guide rollers(5 and 5') of the workpiece.

Then, a high frequency voltage is applied between the workpiece(1) and the electrode wire(2) to start the machining of the workpiece. At the same time, a machining liquid of deionized water is supplied to the machining area to remove the heat of the machining. The machining efficiency, in particular the machining speed, significantly depends on machining parameters such as the feeding speed of the machining liquid, machining current, and the shape and frequency of the machining voltage, and it is known to improve the machining efficiency through a control of the machining parameters.

Since copper has a high electrical conductivity and is easy to form fine wire due to its high elongation property, a copper wire was used initially. However, it revealed many deficiencies mainly due to its low mechanical strength. For example, high tensile strength could not be applied to the copper wire during the machining so that vibration of the wire can not be controlled, resulting in an inferior machining accuracy and tendancy of wire breakage. Moreover, machining speed was relatively slow. Therefore, a molybdemum wire or a tungsten wire as a high strength wire has been used for a special application of a high precision machining. A brass wire having 63–67 wt % copper and 33–37 wt % zinc has been developed for the general purpose of wire electrical discharge machining.

The brass wire has a tensile strength about twice to a copper wire and the machining speed can be improved due to the presence of zinc content in the alloy, which provides a stable discharge and a vaporization power during the machining.

Moreover, as the application field of the wire electrical discharge grows up, it was required for the brass wire to further increase the tensile strength and to improve the machining speed. Therefore, elements such as Al and/or Si can be added to a brass wire to improve the tensile strength and machining speed.

An the other hand, it was known that the machining speed of a brass wire increases when zinc content includes more than 40 wt % in the brass. However, in that case, drawing process to form a wire becomes difficult because of the presence of a brittle phase in the alloy.

U.S. Pat. No. 4,287,404 discloses a zinc coated wire on copper or brass core and the method of manufacturing the same. On a core material having relatively high tensile strength or high electrical conductivity such as copper, brass or steel, a coating material having a relatively low vaporization temperature such as zinc, cadmium, tin, antimony, bismuth or the alloy was electroplated to form a coated wire. According to the wire and the method, the core allows to maintain required mechanical strength or conductivity, and the coating increases cooling ability and flushability because of its relatively low vaporization temperature, thereby improving machining speed and accuracy. Further, the coating material vaporizes easily by the heat during the machining, it protects core material because of the cooling effect of the coating material. Thus, the method of manufacturing the coated wire may include the coating step of zinc electroplating after the final sizing the wire or prior to the final sizing of the wire.

A method of improving the performance of a coated wire was disclosed in U.S. Pat. No. 4,977,303. According to the patent, the method includes steps of; on a metallic core, a coating step of zinc, cadmium or the alloy which forms mixed alloy layer with the core after heat treatment by diffusion annealing; a heat treatment step of the coated wire at 700° C. in an oxidizing atmosphere to form a mixed alloy layer between the core material and the coating material, for example copper-zinc alloy and drawing the coated wire accompanying a mechanical hardening. The coated wire by the method includes a core, a mixed alloy layer and an outer oxide layer. At this time, the oxide layer prevents possibility of short circuits between the wire and the workpiece during the electrical discharge machining, which is not directly related to the machining speed. The improvement in the machining speed of the wire is known to lie on the heat treatment step forming copper-zinc alloy layer, but the mechanism was not clearly revealed.

U.S. Pat. No. 4,686,153 discloses a coated wire having a copper clad steel core and a coating layer of zinc alloy formed on the core, and the method of manufacturing the same. The high strength of steel in the core can provide a superior machining accuracy and the clad copper can provide a good conductivity to the coated wire. On this copper clad steel, zinc coating is applied by electroplating or hot dip galvanizing followed by heat treatment to form a copper-zinc alloy layer. Particularly, when the zinc content in the alloy layer is in the range of 40–50 wt %, the improvement of the coated wire in machining speed becomes evident compared with a simple zinc coated copper clad steel. The coated wire according the patent includes a copper clad steel core and a copper-zinc alloy layer. At the same time, the zinc content in the alloy layer ranges 10–50 wt %, preferably 40–50 wt %. The method of manufacturing the same includes steps of; a providing step of a copper clad steel core, a zinc electroplating step on the core, a drawing step of the zinc coated core to form a wire having a desirable diameter and a heat treatment step of the wire to convert the zinc coating layer into a copper zinc alloy layer having zinc content of 10–50 wt %, preferably 40–50 wt % in such a manner that the concentration of the zinc is gradually decreased along the radially inward direction. Alternatively, the drawing step may be applied prior to the heat treatment step and the zinc coating may use hot dip galvanizing.

SUMMARY OF THE INVENTION

As mentioned previously, the improvement of the machining speed of the coated wire was achieved by coating the core with a material such as zinc which have a melting temperature and vaporization temperature lower than core material, and a further improvement was achieved by heat treating the zinc layer on the core to form a copper-zinc alloy layer through diffusion reaction between the core and the coating. However, the improvement significantly depends on the selection of the coating metal having lower vaporization temperature than the core metal. Thus, the improvement was limited to the nature of the coating metal.

A purpose of the present invention is to provide a coated wire for electrical discharge machining with improved machining speed by increasing the surface area of the wire which will be in contact with cooling liquid so as to increase the cooling ability of the wire.

Another purpose of the invention is to provide a coated wire for electrical discharge machining with improved machining speed by allowing the contact of the cooling liquid not only with the surface of the wire but also with inner part of the wire.

Still another purpose of the invention is to provide a method of manufacturing a porous coated wire with increased surface area without additional steps. Still another purpose of the invention is to provide a coated wire for electrical discharge machining with improved flushability without decreasing the machining accuracy during the machining.

Therefore, the above mentioned purposes are achieved by the method including the steps of; providing a wire having a first diameter made of a first metal, hot dip galvanizing the wire by passing the wire in a desirable time through a molten of a second metal having vaporization temperature lower than the first metal, thereby forming an alloy layer by the diffusion reaction between the first metal and the second metal having hardness higher and an elongation lower than the first metal and the second metal and a coating layer made of the second metal, and drawing the wire having the alloy layer and the coating layer to form a second diameter, thereby forming cracks in the alloy layer and the coating layer due to the high hardness and the low elongation of the alloy layer.

At this time, the first metal may use copper or brass having 63–67 wt % copper and 33–37 wt % zinc. Further, the second metal may use zinc, aluminum or tin.

Particularly in the present invention, the wire made of the first metal needs to pass the molten bath in a desirable time so as to achieve a desirable thickness of the coating layer and alloy layer including the second metal. The desirable time depends on the length. Foe example, the take-up speed of the wire should be fast when the length of the bath is relatively long, and the take-up speed of the wire should be slow when the length of the bath is short. Thus, the take-up speed and the length of the bath are selected to form the thickness of the coating layer having 3–10 μm on the wire having the first diameter.

The method of manufacturing a coated wire according the present invention may further include heat treatment step to stabilize the mechanical property of the wire.

Further, the method may include removing step of the coating layer on the alloy layer.

The coated wire for electrical discharge machining, according to the present invention, includes a core made of a first metal including copper, an alloy layer formed on the core and a coating layer made of a second metal, wherein the alloy layer having a higher hardness than the core or the coating layer is formed during the hot dipping galvanizing step by diffusion reaction between the first metal and the second metal having vaporization temperature lower than the first metal, and wherein the alloy layer includes cracks having direction perpendicular to the longitudinal direction of the wire.

The alloy layer having a high hardness and a low elongation is formed by diffusion reaction of the first metal and the second metal during the hot dip galvanizing step passing the wire, having the first diameter, made of the first metal into a molten bath of the second metal having lower vaporization temperature. Then, the wire coated with the second metal is drawn to form the wire having the second diameter. At this time, the first metal covered by the alloy layer and the coating layer becomes a core of the wire. Further, the porous nature of the wire arises from the cracks in the alloy layer and the coating layer during the drawing step.

Further, the coated wire for electrical discharge machining, according to the present invention, includes a core made of a first metal including copper and an alloy layer formed on the core, wherein the alloy layer having a higher hardness than the core or the second metal is formed during the hot dipping galvanizing step by diffusion reaction between the first metal and the second metal having vaporization temperature lower than the first metal, and wherein the alloy layer includes cracks having direction perpendicular to the longitudinal direction of the wire.

BRIEF DESCRIPTION OF THE ATTACHED DRAWINGS

DETAILED DESCRIPTION OF THE PREFERRED EMBODIMENTS

Figure 1:
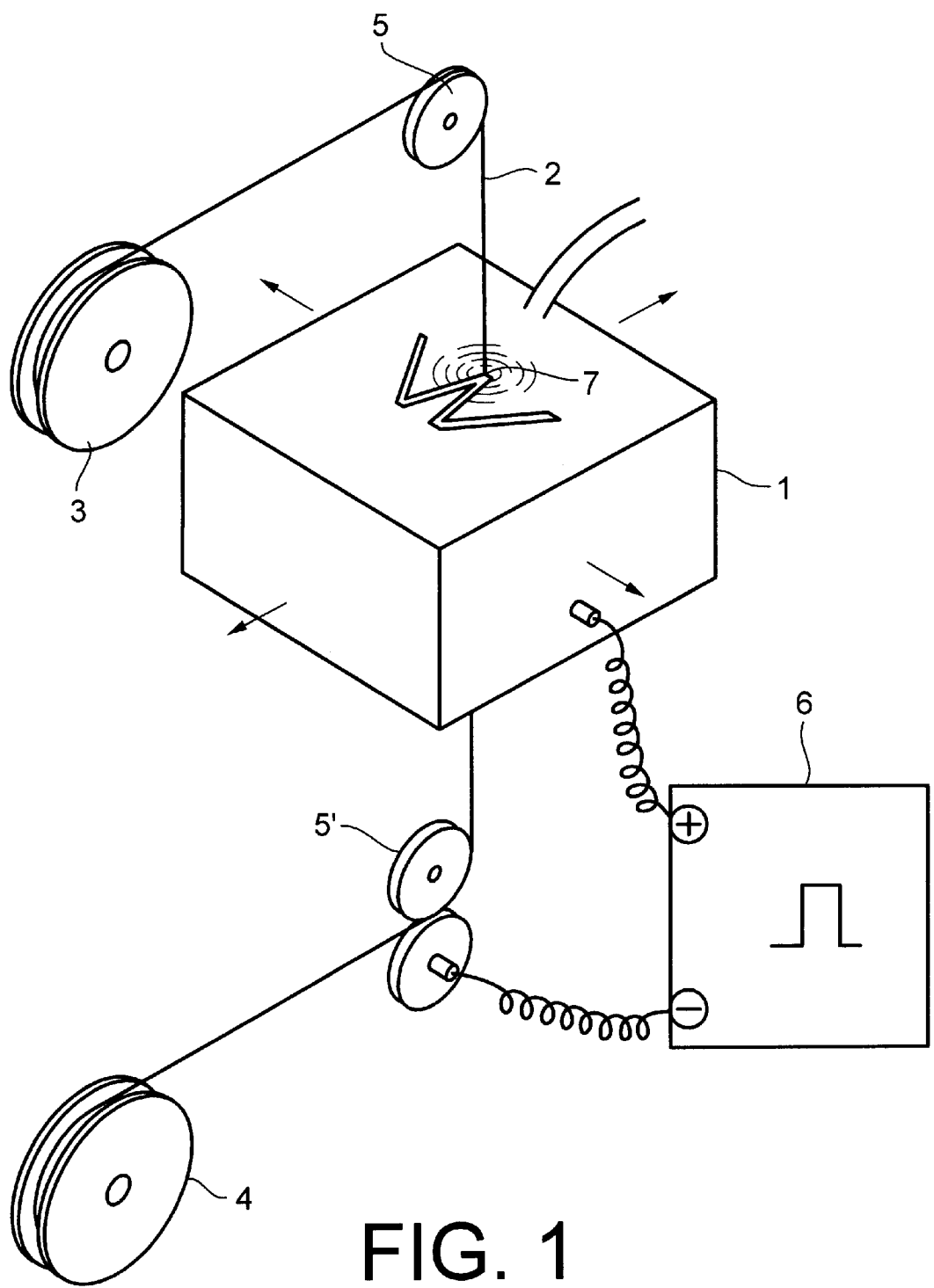
FIG. 1 is a schematic drawings showing the structure and a principle of a general wire electrical discharge machining.
Figure 2:
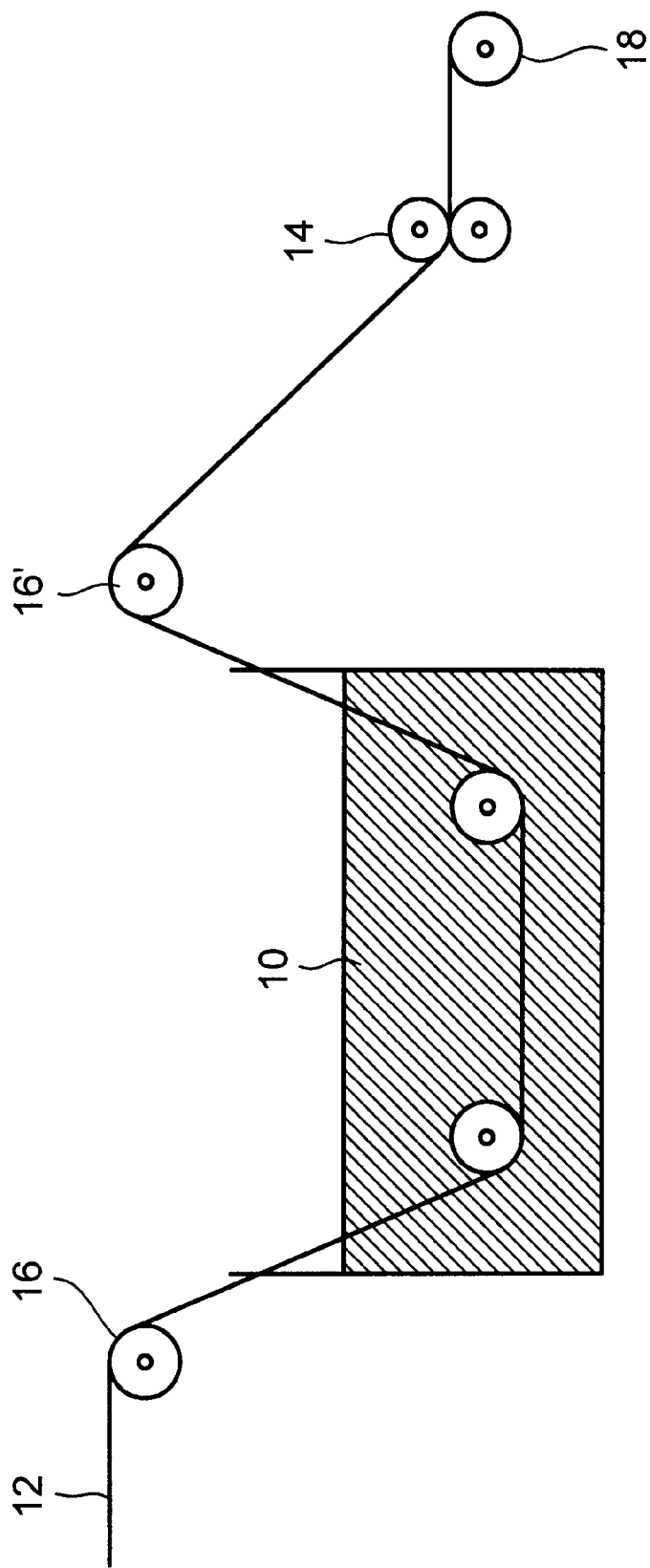
FIG. 2 shows steps of manufacturing porous coated wires for electrical discharge machining.

The present invention will be explained in detail with preferred embodiments. FIG. 2 shows the steps of manufacturing porous electrode wires for electrical discharge machining, according to the present invention. First, a brass wire having an intermediate diameter of 0.9 mm and made of 35 wt % zinc and 65 wt % copper is provided as a core wire(12). The core wire(12) is passed through a molten bath(10) of zinc having a vaporization temperature lower than the brass for a given time to form a coating layer made of zinc on the core wire(12). At this time, an alloy layer is simultaneously formed on the core wire by diffusion reaction of the brass of the core wire and zinc of the coating layer. Thus, the coating layer is formed on the alloy layer which has the highest hardness and the lowest elongation among others.

Figure 3A:
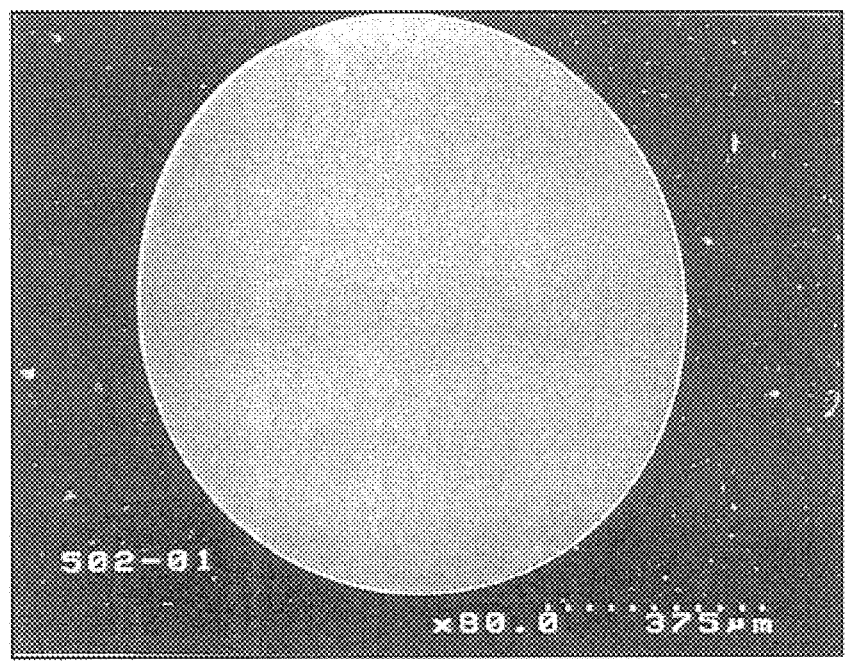
FIG. 3A is a photograph of a wire after coating step and prior to drawing step according to the present invention.
Figure 3B:
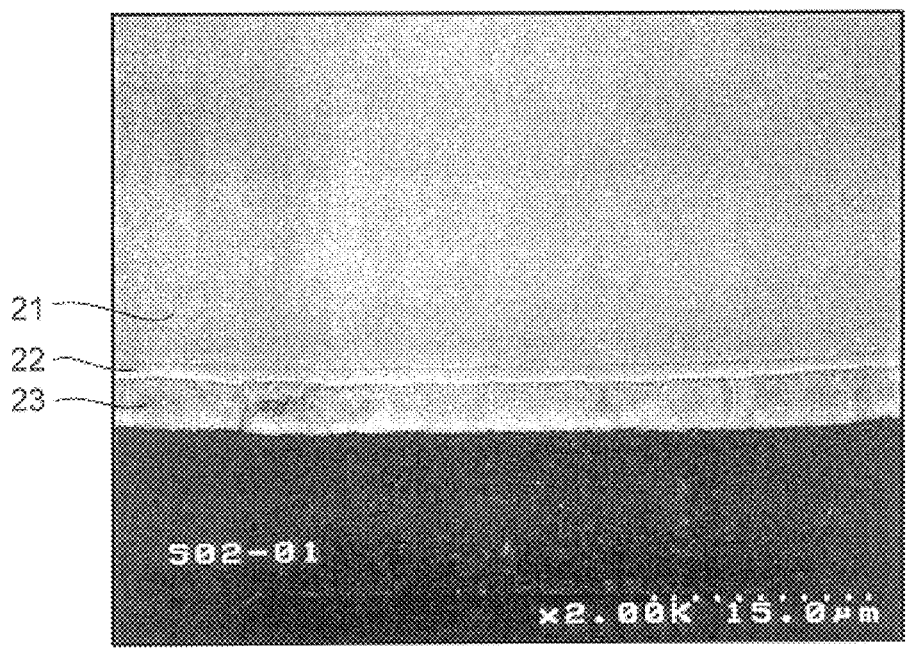
FIG. 3B is an enlarged view of a part of FIG. 3A.

With reference to FIG. 3A showing a photograph after the coating step of zinc on the brass core wire and FIG. 3B showing an enlarged view of FIG. 3A, it is possible to observe that the alloy layer(22) and the coating layer(23) are formed sequentially on the brass core wire(21).

The coated core wire(12) thus formed is drawn through a drawing means(14) to form a desirable diameter of the wire, for example 0.05–0.35 mm. Guide rollers (16) and (16') help guide the wire to the drawing means (14), and the take-up roll (18) collects the drawn wire. At this time, since the alloy layer between the core and the coating layer has the highest hardness and lowest elongation, a porous structure on the surface of the wire is formed during the drawing step due to the cracks in the alloy layer having direction approximately perpendicular to the drawing direction.

The wire is followed by a heat treatment step to stabilize the mechanical property.

Figure 4A:
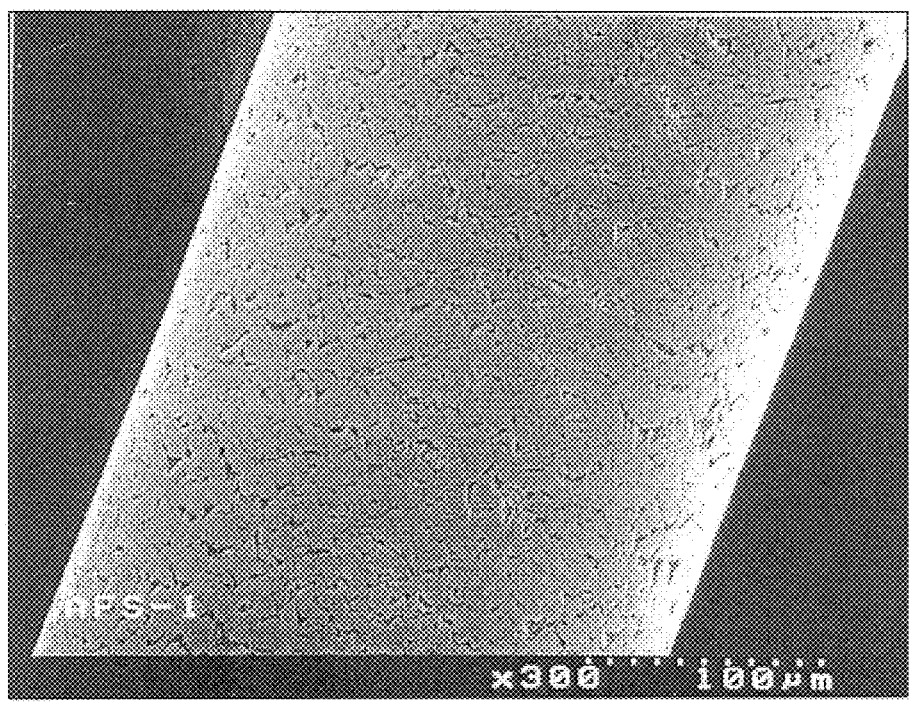
FIG. 4A is a photograph of a porous coated wire according to the present invention, showing the surface morphology.
Figure 4B:
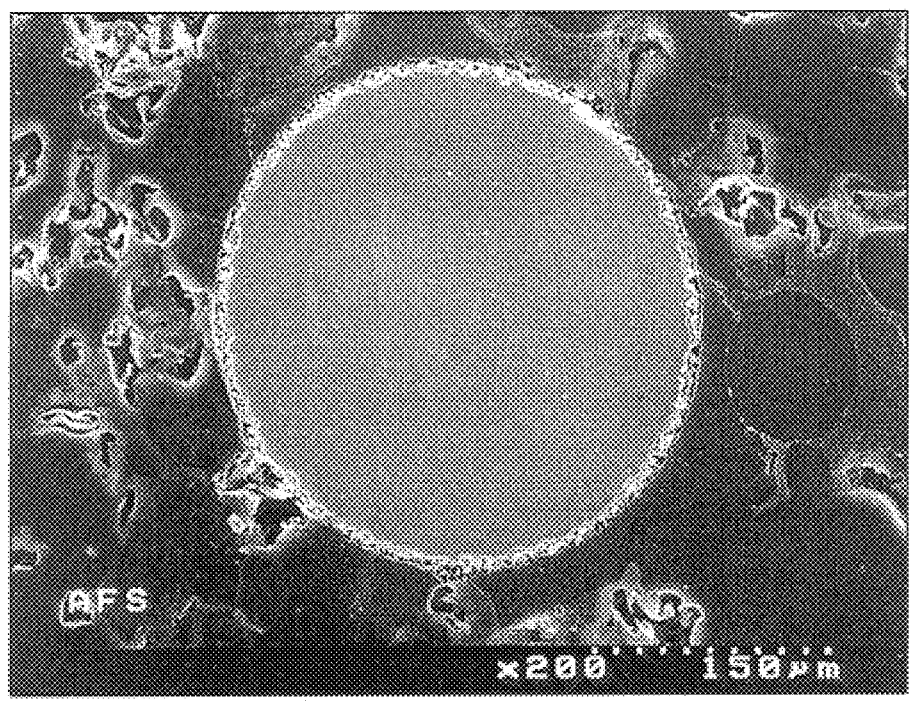
FIG. 4B is a photograph of a porous coated wire according to the present invention, showing the cross-section.

FIG. 4A shows the surface morphology of the porous wire, and FIG. 4B shows cross-section of the porous wire according to the present invention. With reference to FIG. 4A, it is observed that the cracks have direction approximately perpendicular to the longitudinal direction of the wire. These cracks are formed by drawing the hard alloy layer and, as shown in FIG. 4B, the alloy layer and the coating layer are porous with spongy-like structure.

The structure of the porous coated wire includes a core (21) made of brass and the surrounding coating layer(23) made of zinc. The core wire(21) may use copper or brass which includes copper. Thus, the core wire(21) satisfies electrical conductivity and mechanical strength required for the electrode wire for electrical discharge machining and the coating material(23) protects the core wire(21) and increases the machining speed. At the same time, since the coating layer(23) has a porous structure, the wire reveals improved cooling ability compared with a conventional coated wire. This is because the surface area of the wire to contact with cooling liquid significantly increase during the electrical discharge machining. Since the improved cooling ability allows to maintain relatively lower temperature for a given material, it is possible for the electrode wire with improved cooling ability to increase relative electrical conductivity so as to improve the machining speed and also possible to improve mechanical strength of the core wire so as to improve the machining accuracy during the machining. Thus, the porous coated wire with improved cooling ability according to the present invention is expected to improve the machining accuracy and the machining speed at least 15% faster than a conventional coated wire. The requirement for the material for the coating includes a melting temperature or vaporization temperature lower than that of core material, being able to be coated to the core metal including copper or brass by hot dip galvanizing process and being able to form an alloy layer with the core metal during the coating process by diffusion reaction. These materials include zinc, aluminium and tin. Thus, it is possible to form a porous structure in the coating layer during the drawing step of the coated core wire because of the alloy layer between the core and the coating layer having different hardness and elongation properties than the core.

In FIG. 3A, a relatively uniform distribution of cracks on the coated wire can be observed. The crack propagation direction is approximately perpendicular to the longitudinal direction of the wire which is the drawing direction of the wire. Further, the cracks are mainly formed by intergranular crack with minor transgranular cracks. On the other hand, The surface of the porous wire maintains uniform profile of periphery rather than having sharp protrusions. Therefore, The possibility of evolution of particles from the wire during the machining becomes low. Further, the particles of the machining may be easily removed by the cracks of the porous wire so that the flushability of the wire can be improved in comparison to the conventional coated wire.

PREFERRED EMBODIMENT 1

A brass wire having 63–67 wt % copper and 33–37 wt % zinc is prepared as a core wire of an intermediate diameter. Hot dip galvanizing is practiced on the core wire to form a coating layer. The hot dip galvanizing may use zinc, aluminium, tin or their alloys and particularly, zinc is preferred. According to a conventional hot dip galvanizing process, the core wire undergoes pre-treatment of alkali degrease and acid cleaning. Then, it passes ammonium chloride flux bath. Subsequently, the core wire passes a molten bath of zinc. At this time, the temperature of the bath is maintained 400–500° C. and the core wire is coated for about 1–10 seconds to form a zinc coating layer and a copper-zinc alloy layer. The alloy layer is formed by a diffusion reaction between the core and the zinc and the coating layer of zinc is formed thereon. Further the alloy layer is the hardest layer among others and has lower elongation than the core.

Thus, an copper-zinc alloy layer of 1–2 $\mu$m and a zinc coating layer 3–8 $\mu$m are formed on the brass core wire, which are compact layers. The formation of the alloy layer allows superior adhesion between the core wire and the zinc coating layer.

The coated wire having intermediate diameter is cooled in air atmosphere, then is followed by a drawing step to form a fine wire having a desired diameter ranged from 0.05 mm to 0.30 mm. At this time, since the alloy layer has properties of a high hardness and a low elongation compared with the core wire, the fine wire, during the drawing step, produces uniform cracks in the coating layer and the alloy layer to form a porous structure on the surface. These cracks are propagated through the grain boundary of the coating layer and the direction of the propagation is perpendicular to the longitudinal direction of the wire since the drawing direction is the same to the longitudinal direction of the wire. Further, the outer zinc layer may be removed. Then, the fine wire after the drawing step having a desired diameter undergoes a heat treatment at 300–600° C. for about 1–2 seconds in order to stabilize its mechanical property, which makes final products of the porous coated wire.

ADVANTAGES OF THE PRESENT INVENTION

The porous coated wire for electrical discharge machining according to the present invention improves the machining speed about 15% compared with a conventional zinc coated wire. This is due to the porous structure of the wire which increases cooling ability of the wire in contact with a cooling liquid during the machining. On the other hand, since the surface of the porous coated wire maintains uniform profile of periphery rather than having sharp protrusions, it does not have negative effects to the machining accuracy. Rather, the porous nature allows to remove the particles during the machining so as to improve machining accuracy with improved flushability. Therefore, the method manufacturing the porous coated wire according to the present invention does not requires an additional step to improve the machining speed and the machining accuracy compared with the conventional method of manufacturing a coated wire.

What is claimed is:

1. A method of manufacturing a coated electrode wire for use in electrical discharge machining comprising:

providing an intermediate wire having a first diameter and made of a first metal including copper;

hot dip galvanizing the intermediate wire through a molten bath of a second metal having vaporization temperature lower than the first metal for a desired time and temperature, wherein an alloy layer is formed on the intermediate wire by diffusion reaction of the first metal and the second metal, having hardness higher and lower elongation than the first metal and second metal, and wherein a coating layer is formed on the alloy layer; and drawing the intermediate wire having the alloy layer and the coating layer to form a coated electrode wire having a second diameter, wherein cracks are formed during the drawing step in the alloy layer and the coating layer due to the high hardness and low elongation.

2. The method according to claim 1, further comprising:

heat treating the coated electrode wire having the second diameter to stabilize its mechanical properties.

3. The method according to claim 1, wherein the first metal is made of a brass.

4. The method according to claim 3, wherein the second metal includes zinc, aluminum, tin or alloys thereof.

5. The method according to claim 4, wherein the desired time allows to form the coating layer of 3–10 μm on the intermediate wire.

6. The method according to claim 1, wherein the second metal includes zinc, aluminum, tin or alloys thereof.

7. The method according to claim 6, wherein the desired time allows to form the coating layer of 3–10 μm on the intermediate wire.

8. The method according to claim 1, wherein the desired time allows to form the coating layer of 3–10 μm on the intermediate wire.

9. The method according to claim 1, further comprising:

removing the coating layer formed on the intermediate wire.

10. The method according to claim 9, wherein the first metal is made of a brass.

11. The method according to claim 9, wherein the second metal includes zinc, aluminum, tin or alloys thereof.

12. The method according to claim 11, wherein the desired time allows to form the coating layer of 3–10 μm on the intermediate wire.

13. The method according to claim 9, wherein the desired time allows to form the coating layer of 3–10 μm on the intermediate wire.

14. An electrode wire for use in electrical discharge machining comprising;

a core wire made of a first metal including copper;

an alloy layer formed on the core wire; and a coating layer on the alloy layer made of a second metal having vaporization temperature lower than the first metal, wherein the alloy layer is formed by diffusion reaction between the first metal and the second metal and has a higher hardness and lower elongation than the core wire or the coating layer, and wherein cracks are formed in the alloy layer and the coating layer having direction perpendicular to the longitudinal direction of the electrode wire.

15. The electrode wire according to claim 14, wherein the cracks in the alloy layer and the coating layer is formed during the drwaing of the core wire in the direction of the longitudinal direction.

16. The electrode wire according to claim 14, wherein the first metal is made of a brass.

17. The electrode wire according to claim 16, wherein the second metal is made of zinc, aluminum, tin or alloys thereof.

18. The electrode wire according to claim 15, wherein the second metal is made of zinc, aluminum, tin or alloys thereof.

* * * * *